Patented Oct. 21, 1947

2,429,556

UNITED STATES PATENT OFFICE 2,429,556

HYDROXY SUBSTITUTED TRIPHENYL VINYL HALIDES

Charles F. Longfellow, Bloomfield, and Arnold O. Jackson, Nutley, N. J., assignors to G. W. Carnrick Company, Newark, N. J., a corporation of New Jersey No Drawing. Application April 29, 1944, Serial No. 533,394

6 Claims. (Cl. 260—619)

This invention relates to compounds having estrogenic activity, and more particularly to certain hydroxy substituted triphenyl vinyl halides having this property.

A large group of compounds having estrogenic activity have the cyclo pentano phenanthrene ring structure, such as estrone, estradiol, esters and other derivatives of this type. These compounds are all analogous in chemical structure to the hormone occurring in nature. Other compounds, such as stilbestrol and related compounds have also been proposed as having estrogenic activity.

In accordance with our invention, we have discovered that compounds which are quite different in chemical structure from those compounds mentioned, nevertheless possess marked estrogenic activity. These compounds also have other desirable properties, such as a minimum of side reactions and other characteristics which render them suitable for administration. In addition they may be synthesized by a process which can be readily practiced on a commercial scale.

The primary object of our invention is the provision of estrogenic compounds of the type described more particularly herein. Other objects will appear from the following description.

The compounds comprised in our invention may be regarded as hydroxy triphenyl vinyl halides and may be viewed as having the general formula of:

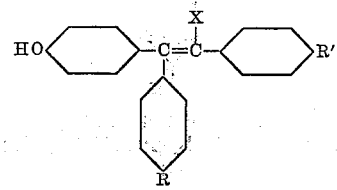

in which X is a halogen, more particularly chlorine or bromine, and in which R is H or OH, and R' is H or Cl.

The compounds may be formed by a process in which an aryl Grignard reagent is reacted with a simple or complex diaryl or hydroxydiaryl ketone with the subsequent decomposition of the addition product to form the corresponding carbinol or ethylene. The carbinol or ethylene may be halogenated directly to form the corresponding triphenyl vinyl halide having at least one hydroxy group, substituted in at least one of the three phenyl groups.

The reaction may be illustrated by the following general formulae:

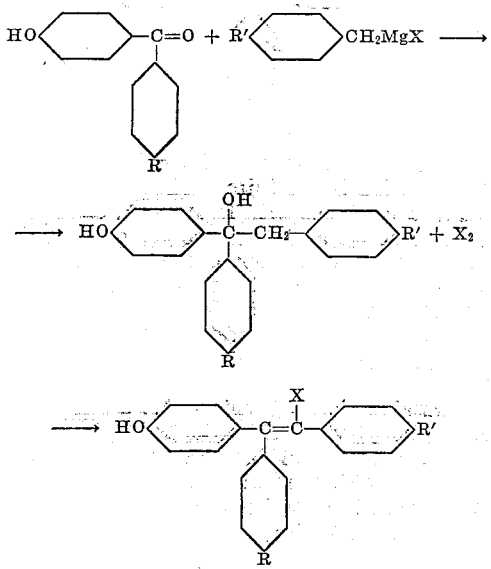

where X, R and R' are the same as has been defined previously.

In order to describe more particularly the compounds comprised in the invention, and the methods by which they may be prepared, the following examples are given merely as illustrative and without any limitation on the scope of the invention as defined heretofore:

Example 1

To 32.0 g. of magnesium is added 250 cc. of dry ether and a crystal of iodine. Into this mixture is introduced 168.5 g. of benzyl chloride in 550 cc. of dry ether at such a rate as to keep the ether refluxing. After all of the benzyl chloride has been added, 66.0 g. of p-hydroxybenzophenone, dissolved in 1000 cc. of dry ether, is added dropwise while external heat is applied to keep the ether refluxing. After all of the ketone is added, the reaction mixture is refluxed for about another hour.

After the reaction mixture has cooled to room temperature, 700 g. of ice and 200 cc. of water containing 100 g. of ammonium chloride is added. The ether layer is separated, washed with water and distilled. To the residue, after the removal of the ether, is added 200 cc. of xylene in which the residue is soluble while hot. Cooling this xylene solution yields a product melting at 130–5°. Recrystallization of this product from xylene yields 1,2,-diphenyl-1-p-hydroxyphenyl ethanol melting at 137–9°, which is the intermediate carbinol product.

Thirty-six grams of 1,2-diphenyl-1-p-hydroxyphenyl ethanol, which may be prepared as above described, is suspended in 500 cc. of carbon tetrachloride and 20 g. of bromine in 100 cc. of carbon tetrachloride is added dropwise. A slight rise in the temperature of the solution results and copious quantities of hydrogen bromide are eliminated. After all of the bromine has been added the solution is concentrated to one half volume and cooled. The solution fills with a solid which is recrystallized from xylene. The product formed is 1,2-diphenyl-2-p-hydroxyphenyl vinyl bromide, which melts initially at 147–9°. Several recrystallizations from methyl alcohol yields a product melting at 158–60°. This compound has the following formula:

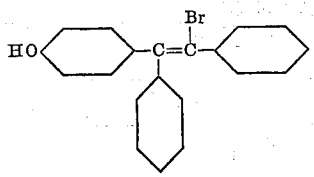

*Example 2*

To 29.0 g. of 1,2-diphenyl-1-p-hydroxyphenyl ethanol, which is the intermediate carbinol prepared in accordance with Example 1, dissolved in 150 cc. of acetic acid is added 7.1 gms. of chlorine. From this reaction mixture after the removal of the acetic acid, there is obtained, by crystallization from a 50–50 mixture of petroleum ether and carbon tetrachloride, α-1,2-diphenyl-2-p-hydroxyphenyl vinyl chloride melting at 101–3°.

Recrystallization of this α-1,2-diphenyl-2-p-hydroxyphenyl vinyl chloride from 75% methyl alcohol finally yields the β form of the same compound melting at 136–8°. These two compounds are believed to be stereo isomers and have the following formula:

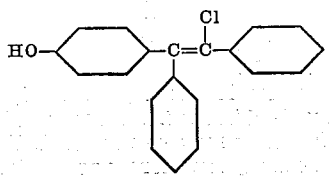

*Example 3*

The Grignard reagent from 9.5 g. of magnesium and 64 g. of p-chlorobenzyl chloride is made by the usual procedure. To this reagent in 350 cc. of dry ether, is added 20 g. of p-hydroxybenzophenone in 350 cc. of dry ether while the solution is refluxed by application of external heat for three hours. To this ether solution, after cooling, is added 300 g. of ice, 100 cc. of water and 100 g. of ammonium chloride. The ether layer is separated and washed with water. The ether is removed by distillation and xylene is added to the residue. Cooling the xylene solution yields a product melting at 134–6°. Recrystallization from xylene yields 1-p-hydroxyphenyl-1-phenyl-2-p-chlorophenyl ethylene melting at 139–140°.

To 10 g. of the above intermediate ethylene, in 350 cc. of carbon tetrachloride, is added dropwise 4.6 g. of bromine in 50 cc. of carbon tetrachloride. After all the bromine has been added, the solution is concentrated to 50 cc. and cooled. The solid is filtered and recrystallized from a 50–50 mixture of petroleum ether and carbon tetrachloride to yield a product melting at 130–5°. Recrystallization of this product from xylene yield 1-p-chlorophenyl - 2 - p-hydroxyphenyl-2-phenyl vinyl bromide melting at 141–3°. This product has a composition indicated by the following formula:

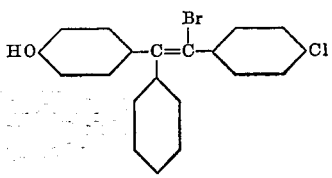

The corresponding 1-p-chlorophenyl-2-p-hydroxy phenyl-2-phenyl vinyl chlorides may be made by modifying the process as indicated in Example 2.

*Example 4*

The Grignard reagent from 85.5 g. of benzyl chloride and 18.0 g. of magnesium is prepared in the usual manner. To this reagent in 500 cc. of dry ether is added dropwise 18.0 g. 4,4'-dihydroxybenzophenone in 1600 cc. of ether. Throughout the addition of the ketone, the ether is kept refluxing by external heat. Total heating period is 13 hours. To the cool solution is added 500 g. of ice, 500 cc. of water and 100 g. of ammonium chloride. The ether solution is separated and washed with water. The ether is distilled. The residue is cooled in the ice box. Some unreacted ketone is removed. The mother liquor is concentrated and the residue recrystallized from benzene to yield 1,1-di-(p-hydroxyphenyl)-2-phenyl ethylene melting at 179–81°.

To 3.0 g. of the above intermediate ethylene, in 50 cc. of acetic acid, is added dropwise 1.6 g. bromine in 10 cc. of acetic acid. The reactants are poured onto ice. The solid is filtered and washed with water. The product is recrystallized from benzene to yield 1-phenyl-2,2-di-(p-hydroxyphenyl) vinyl bromide melting with decomposition at 209–10°. This compound is believed to have a formula as follows:

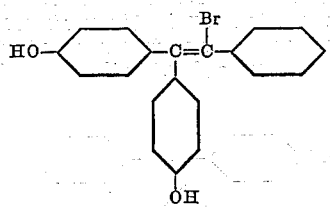

The 1-phenyl-2,2-di-(p-hydroxyphenyl) vinyl chloride may be made by modifying the process as indicated in Example 2, and the 1-p-chlorophenyl-2,2-di-(p-hydroxyphenyl) vinyl bromide and chloride may be made by modifying the process as indicated in Example 3.

In the above examples the temperatures are given in degrees centigrade.

All of the above compounds have been made, their structure established, and their estrogenic activity has been demonstrated by biological tests. Many compounds similar to them have been made and have been found not to have estrogenic activity. From a wide variety of such compounds studied it has been established that the presence of the hydroxy group is essential to the desired estrogenic activity.

One skilled in the art, in view of the illustrative examples, and the general method of making them, will be enabled to prepare many other compounds falling within the novel type of estrogenic compounds comprising our invention, as set forth in the following claims.

We claim:

1. Estrogenic compounds having the following general formula:

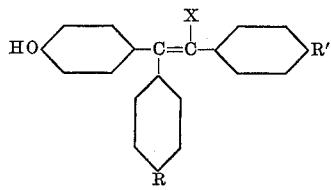

where X is selected from the group consisting of bromine and chlorine, R is selected from the group consisting of H and OH, and R' is selected from the group consisting of H and Cl.

2. Estrogenic compounds having the following formula:

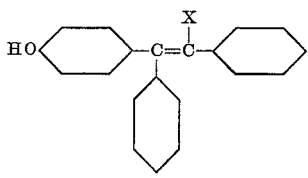

where X is selected from the group consisting of bromine and chlorine.

3. Estrogenic compounds having the following formula:

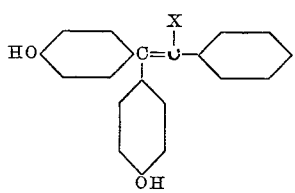

where X is selected from the group consisting of bromine and chlorine.

4. An estrogenic compound of the following formula:

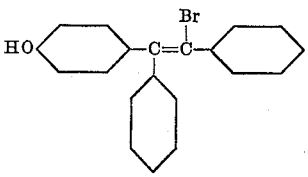

5. Estrogenic compounds having the following general formula:

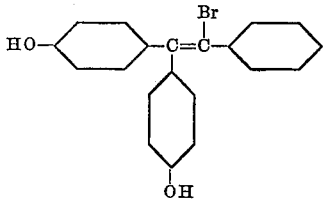

6. An estrogenic compound of the formula:

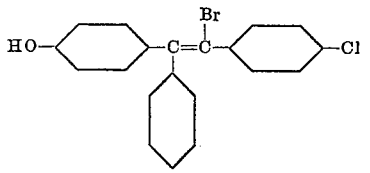

C. F. LONGFELLOW.
ARNOLD O. JACKSON.

REFERENCES CITED

The following references are of record in the file of this patent:

UNITED STATES PATENTS

| Number | Name | Date |
|---|---|---|
| 2,353,684 | Miescher | July 18, 1944 |

OTHER REFERENCES

Robson et al., "Nature," vol. 150, pp. 22–23, July 4, 1942.

Koelsch, "Jour. Am. Chem. Soc." vol. 54, pp. 2487–2493 (1932).

Dodds et al., "Nature," vol. 142, p. 212, July 30, 1938.